US009701435B2

(12) United States Patent
Piechocinski

(10) Patent No.: US 9,701,435 B2
(45) Date of Patent: *Jul. 11, 2017

(54) FOLDABLE LIQUID RETAINING BOWL

(71) Applicant: Carol Jean Piechocinski, Kings Beach, CA (US)

(72) Inventor: Carol Jean Piechocinski, Kings Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/363,619

(22) Filed: Nov. 29, 2016

(65) Prior Publication Data

US 2017/0129640 A1   May 11, 2017

Related U.S. Application Data

(63) Continuation-in-part of application No. 14/756,880, filed on Oct. 26, 2015, now Pat. No. 9,617,031.

(60) Provisional application No. 62/176,214, filed on Feb. 13, 2015.

(51) Int. Cl.
| | | |
|---|---|---|
| *B65D 5/18* | (2006.01) | |
| *A01K 5/01* | (2006.01) | |
| *B65D 85/72* | (2006.01) | |
| *A01K 7/00* | (2006.01) | |
| *B65D 5/42* | (2006.01) | |
| *B65D 5/56* | (2006.01) | |
| *B65D 5/36* | (2006.01) | |

(52) U.S. Cl.
CPC .............. *B65D 5/3685* (2013.01); *A01K 7/00* (2013.01); *B65D 5/18* (2013.01); *B65D 5/425* (2013.01); *B65D 5/4279* (2013.01); *B65D 5/563* (2013.01); *B65D 85/72* (2013.01)

(58) Field of Classification Search
CPC ........ B65D 5/18; B65D 5/425; B65D 5/4279; B65D 85/72; B65D 5/563; B65D 5/3542; B65D 5/3678; A01K 5/0107; A01K 7/01
USPC ........................ 229/106, 117.05, 117.06, 4.5
See application file for complete search history.

(56) References Cited

U.S. PATENT DOCUMENTS

| | | | |
|---|---|---|---|
| 2,232,088 A | 2/1941 | Waters | |
| 3,733,023 A | 5/1973 | Arneson | |
| 4,014,496 A | 3/1977 | Christensson | |
| 4,762,087 A | 8/1988 | Henecke | |
| 4,867,374 A | 9/1989 | Murray et al. | |
| 5,153,196 A | 10/1992 | McQuaid et al. | |
| 5,351,879 A | 10/1994 | Liu et al. | |
| 5,403,740 A * | 4/1995 | Menefee ............. | C05F 17/0205 229/117.01 |
| 5,641,117 A | 6/1997 | Barker et al. | |
| 6,019,244 A | 2/2000 | Jones | |
| 6,183,814 B1 | 2/2001 | Nangeroni et al. | |

(Continued)

*Primary Examiner* — Christopher Demeree
(74) *Attorney, Agent, or Firm* — Stanzione & Associates PLLC

(57) ABSTRACT

A foldable liquid retaining bowl made from a single sheet of bamboo pulp and a pair of standard fastening devices. The sheet of material is capable of being folded into a bowl form with a base and four side walls without needing to be cut or otherwise modified. The side walls are held together on each end by the fastening device such as a glued joint. The sheet of material is treated on at least one side with a water resistant coating. The folded bowl form is capable of being folded flat for storage and or transport. A preferred embodiment includes the sheet of material being made of Kraft paper coated with Polylactide acid (PLA).

14 Claims, 11 Drawing Sheets

(56) References Cited

U.S. PATENT DOCUMENTS

| | | | |
|---|---|---|---|
| 6,702,179 B2 | 3/2004 | Chang | |
| 2004/0097235 A1* | 5/2004 | Siegel | H04W 4/06 455/445 |
| 2012/0312814 A1* | 12/2012 | Tolibas-Spurlock | B32B 1/02 220/200 |
| 2014/0097235 A1* | 4/2014 | Adams | B65D 5/42 229/103 |

* cited by examiner

FOLDABLE LIQUID RETAINING BOWL

CROSS REFERENCE TO RELATED APPLICATIONS

This application claims priority from U.S. patent application Ser. No. 14/756,880, filed on Oct. 26, 2015, which claims priority from U.S. Provisional Application No. 62/176,214, filed on Feb. 13, 2015, in the United States Patent and Trademark Office, the disclosure of which is incorporated herein in its entirety by reference.

BACKGROUND OF THE INVENTION

Exemplary embodiments of the present general inventive concept relate generally to the field of a portable receptacle for holding food or water and more specifically to foldable liquid retaining bowl.

There are times when a pet owner needs to be able to let his or her pet drink water while in locations other than his or her home. To this end, there is a need for a portable bowl that can be deployed when needed for the above said purpose. Other occasions for needing a foldable bowl include human applications such as needing to use a bowl or cup shape to drink water or other liquid while away from home.

Others have thought of and proposed solutions for a folding bowl, such as Daniel C. Henecke in his U.S. Pat. No. 4,762,087, now in the public domain, where a dish like receptacle is formed of a pliable sheet of material and is inflated to form a bowl shape. Another example of prior art is Paul Jones's U.S. Pat. No. 6,019,244 which discloses a portable foldable leak-proof bowl whose sides fold down towards the base of the bowl forming a relatively flat circular shape in the stored position.

However, there is a deficiency in the prior technology in that the solutions proposed require relatively expensive materials and methods of fabrication causing the resulting bowls to be expensive enough that they cannot be used as a single use, disposable item. Additionally, although the bowls do fold into a relatively flat format for storage and transport, they are not small enough to be easily carried in one's pocket or purse. Finally, the prior technology does not lend itself to be easily recycled and therefore are not ecologically friendly.

BRIEF SUMMARY OF THE INVENTION

Exemplary embodiments of the present general inventive concept provide a liquid retaining bowl that can fold flat for storage and transport.

Exemplary embodiments also provide a liquid retaining bowl that can be manufactured from one sheet of water resistant paper.

Exemplary embodiments also provide a liquid retaining bowl that is inexpensive to manufacture and disposable after use.

Exemplary embodiments also provide a liquid retaining bowl that can fit in the palm of one's hand.

Exemplary embodiments also provide a liquid retaining bowl that is environmentally friendly.

Exemplary embodiments also provide a liquid retaining bowl whose surface can be graphically printed.

Other features and utilities of the present general inventive concept will become apparent from the following descriptions, taken in connection with the accompanying drawings, wherein, by way of illustration and example, exemplary embodiments of the present general inventive concept are disclosed.

In accordance with exemplary embodiments of the present general inventive concept, there is disclosed a foldable liquid retaining bowl comprising: a sheet of flexible material, a pair of fastening members, said sheet of material capable of being folded into a bowl form comprising a base and side walls without needing to be cut or otherwise modified, said side walls being held together on each end by said fastening members, said sheet being treated on at least one side with a water resistant coating, and said folded bowl form capable of being folded flat for storage and/or transport.

BRIEF DESCRIPTION OF THE DRAWINGS

The drawings constitute a part of this specification and include exemplary embodiments of the present general inventive concept, which may be embodied in various forms. It is to be understood that in some instances various aspects of the present general inventive concept may be shown exaggerated or enlarged to facilitate an understanding of the invention.

DETAILED DESCRIPTION OF THE PREFERRED EMBODIMENTS

Detailed descriptions of the preferred embodiments are provided herein. It is to be understood, however, that the present general inventive concept may be embodied in various forms. Therefore, specific details disclosed herein are not to be interpreted as limiting, but rather as a basis for the claims and as a representative basis for teaching one skilled in the art to employ the present general inventive concept in virtually any appropriately detailed system, structure or manner.

Figure 1:
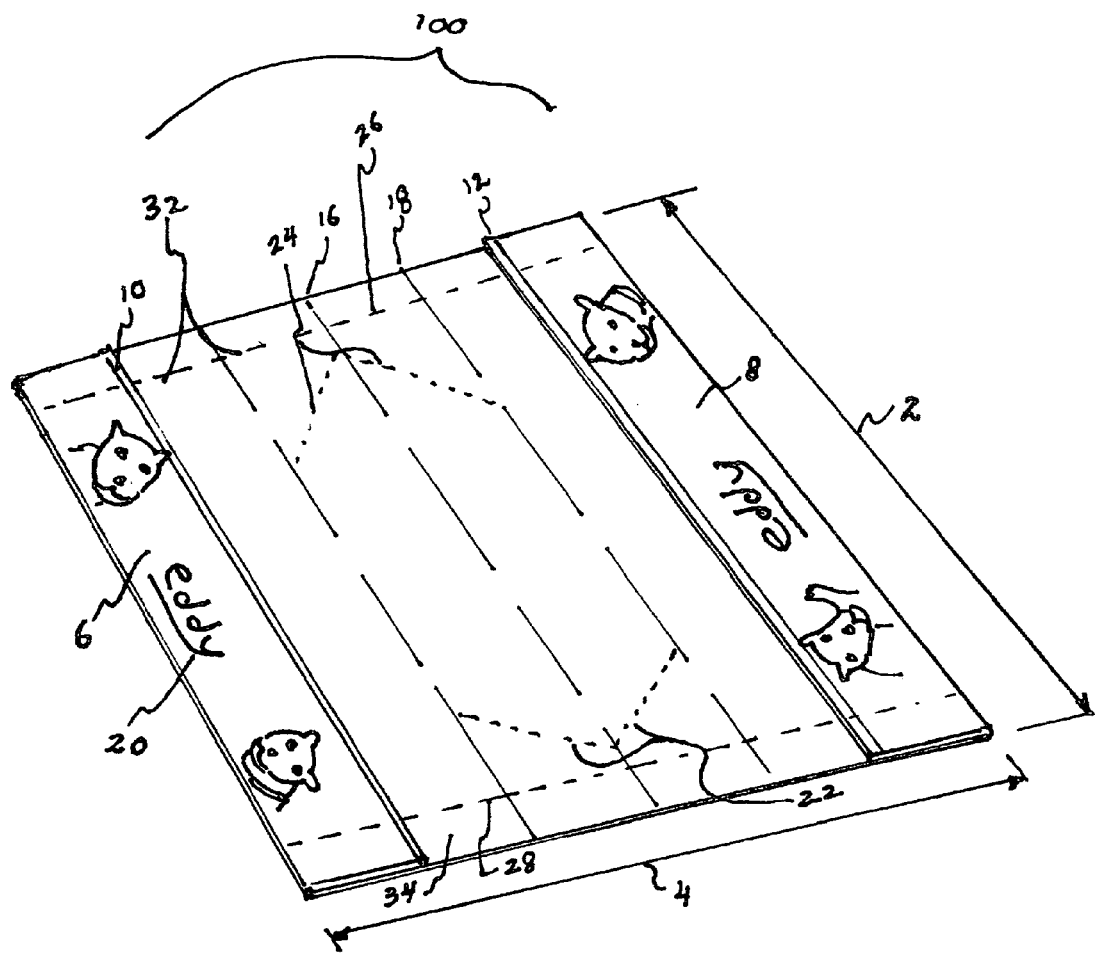
FIG. 1 is a perspective view of an exemplary embodiment of the present general inventive concept in its flat, unfolded condition.

Referring now to FIG. 1, we see a perspective view of a sheet 100 in its open and relatively flat condition in its rectangular sheet form according to an exemplary embodiment of the present general inventive concept. Right and left portions 6, 8 have been folded over and adhered into place to increase the stability of the side walls, however, this is an optional feature. The sheet 100 will work without the double sheet condition formed by the fold. According to an exemplary embodiment of the present general inventive concept, the sheet 100 includes only enough material for a single-thickness lip, i.e., a lip that is not folded over. This embodiment uses less material and may therefore be made more cheaply than a bowl with a folded-over lip. According to another exemplary embodiment of the present general inventive concept, folded portions 6, 8 include enough material to form a reinforced lip 10, 12 along all four sides of the completed bowl, as will be shown in FIG. 4. Dotted lines 14, 16, 18, 22, 24 indicate fold lines necessary to allow the single sheet 100 to form a bowl shape that can also be folded into a flat condition for storage and transport. Graphic images 20 can be printed on the side panels 6, 8. and on any other surface of the sheet 100. The sheet 100 may be made of, for example, a paper-like material. The sheet 100 is preferably made of forty gram weight Kraft paper coated with forty gram weight PLA. PLA stands for Polylactic acid or polylactide and is a biodegradable thermoplastic aliphatic polyester derived from renewable resources, such as corn starch, tapioca roots, chips or starch, or sugarcane material. PLA is a waterproof coating. The material has been certified by AIB-Vincotte international for being compostable as well as recyclable. The material is sold under the trademark "FT1". The approximately forty gram paper weight is heavy enough to create a functional bowl, and yet pliable enough to be able to be easily folded into a flat condition for storage and transport. The waterproof coating makes the inner surface of the bowl capable of retaining liquid, but also meets the criteria for being able to be recycled and compostable and is therefore environmentally friendly. Other paper and non paper materials may be used as long as they fit the criteria of being low cost and environmentally friendly. The low cost of the materials and labor for making the sheet 100 mean that it can be used as a disposable item. The sheet material described above can be disposed of without needing special recycling procedures such as chopping or pulverizing that many plastic and metal materials require.

According to an exemplary embodiment of the present general inventive concept, the sheet 100 may be formed of bamboo pulp. Bamboo pulp offers an advantageous strength-to-weight ratio, thereby allowing the resulting bowl to be both strong and lightweight. Bamboo pulp is also biodegradable, thereby the bowl formed from the sheet 100 will be environmentally friendly.

Figure 2:
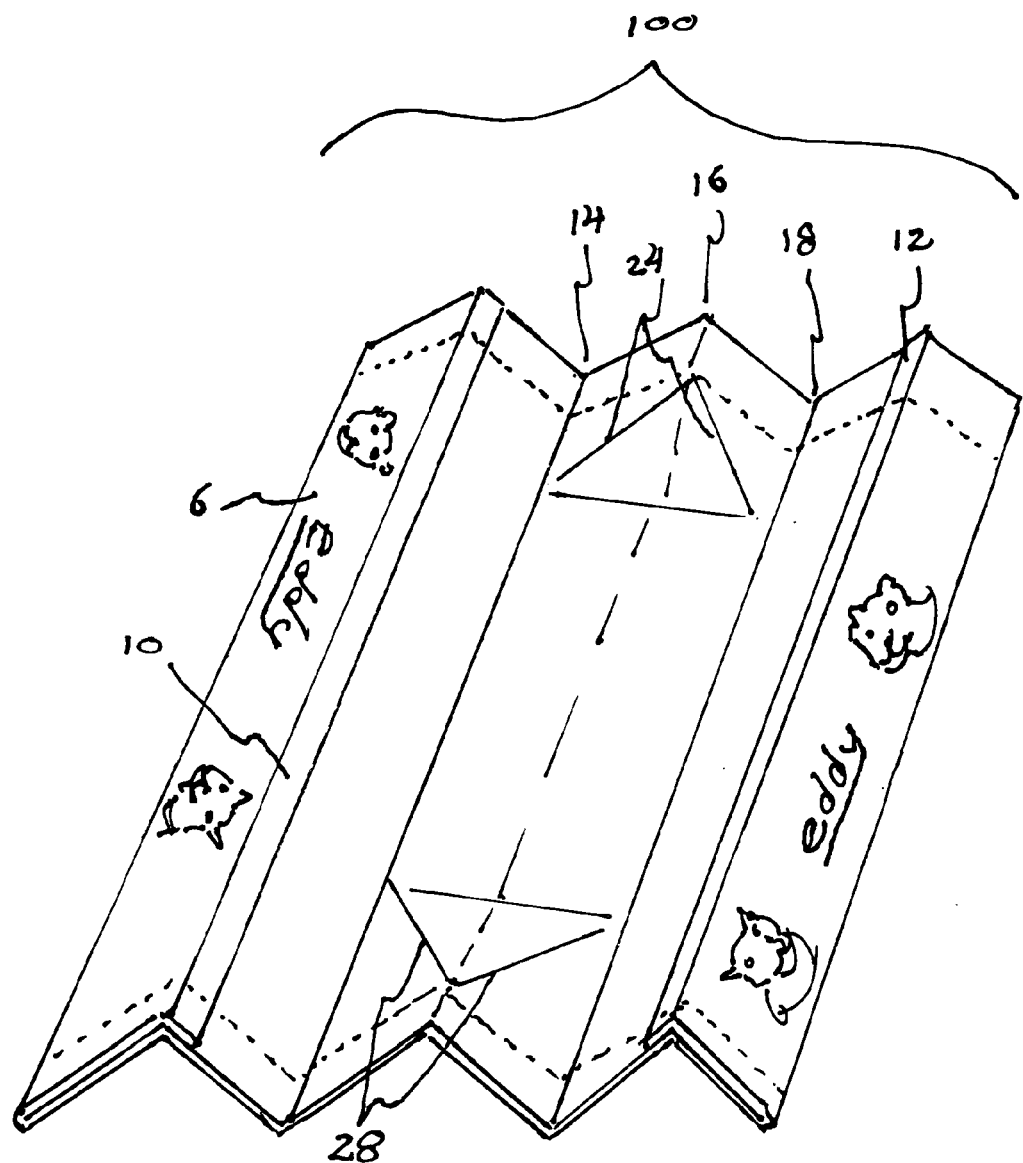
FIG. 2 is a perspective view of an exemplary embodiment of the present general inventive concept in its partially folded condition.

FIG. 2 shows a partially folded perspective view of the sheet 100 according to an exemplary embodiment of the present general inventive concept. Reinforced side edge members 10, 12 can be clearly seen. Lines 24, 28 show the beginnings of triangular folds that help form the resulting bowl shape. Obviously the sheet 100 can be made of other flexible sheet paper materials or sheet plastic materials such as thin polyethylene or polypropylene, however the plastic sheets are more expensive and not as easily recycled.

Figure 3:
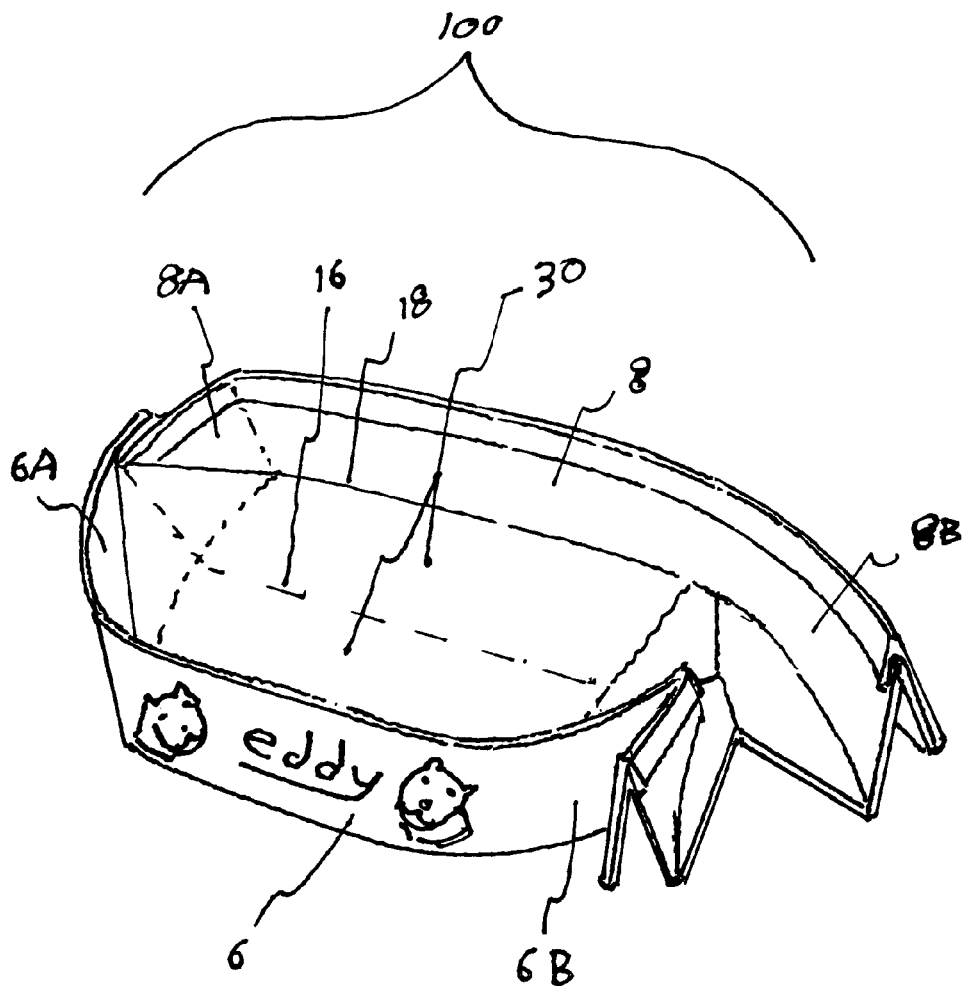
FIG. 3 is a perspective view of an exemplary embodiment of the present general inventive concept in a more fully folded condition.
Figure 9:
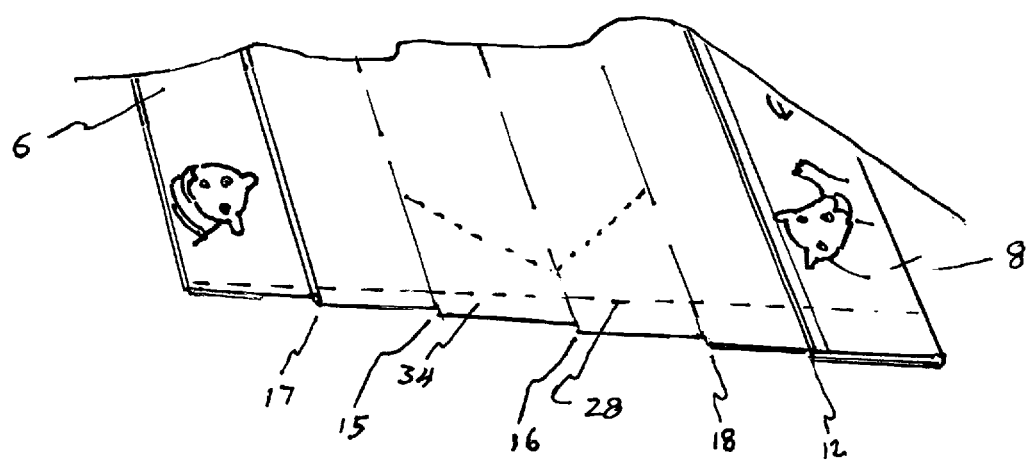
FIG. 9 is a partial perspective view of an exemplary embodiment of the present general inventive concept showing a stepped edge for easier gluing or other attachment methods.

FIG. 3 shows a more fully folded perspective view of an exemplary embodiment of the sheet 100 where the left side is completely folded into the bowl condition and the right side is in the process of being folded into the bowl condition. Side wall 6 bends to form end wall 6A and 6B. Side wall 8 bends to form end walls 8A and 8B. The base 30 is formed by the portions of paper on each side of fold line 16. FIG. 9 shows one embodiment of the edge of the sheet 100 where the leading edge, shown in FIG. 9, and trailing edge, not illustrated, are stepped between each fold segment 12, 18, 16, 15, 17, so that when the sheet 100 is folded as shown in FIG. 4, each stepped segment can be glued or otherwise fastened directly to the side walls 6, 8.

Figure 4:
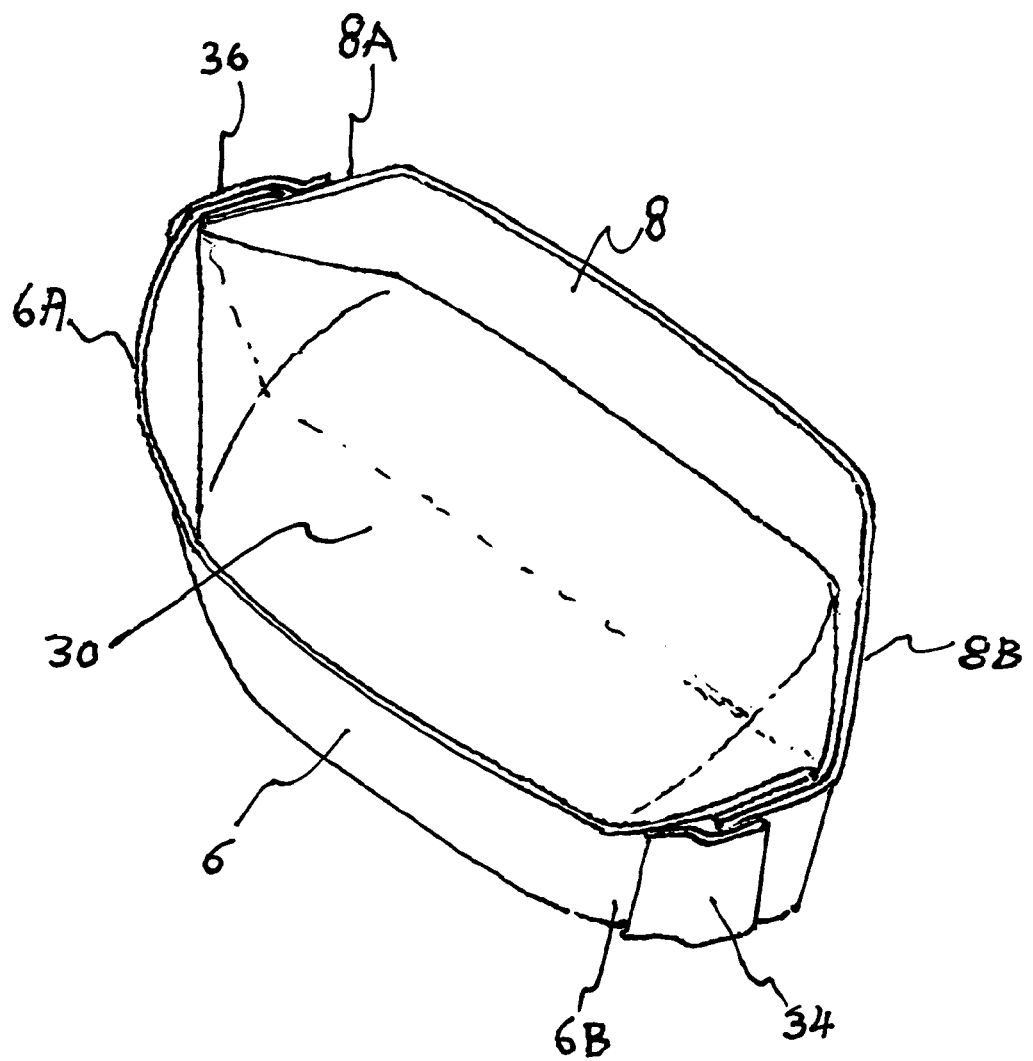
FIG. 4 is a perspective view of an exemplary embodiment of the present general inventive concept in its fully folded and deployed condition.

FIG. 4 is a respective view of the fully folded and deployed bowl of the sheet 100 according to an exemplary embodiment of the present general inventive concept. The sides 6A and 8A are held together by adhesive strip 36. The sides 6B and 8B are held together by adhesive strip 34. In an alternate exemplary embodiment of the present general inventive concept, both sides of the sheet 100 are coated with a polyurethane material that can be RF welded together thereby eliminating the need for adhesive strips 34, 36. Other methods of attachment include gluing, stapling, riveting or any other standard fastening means.

Figure 5:
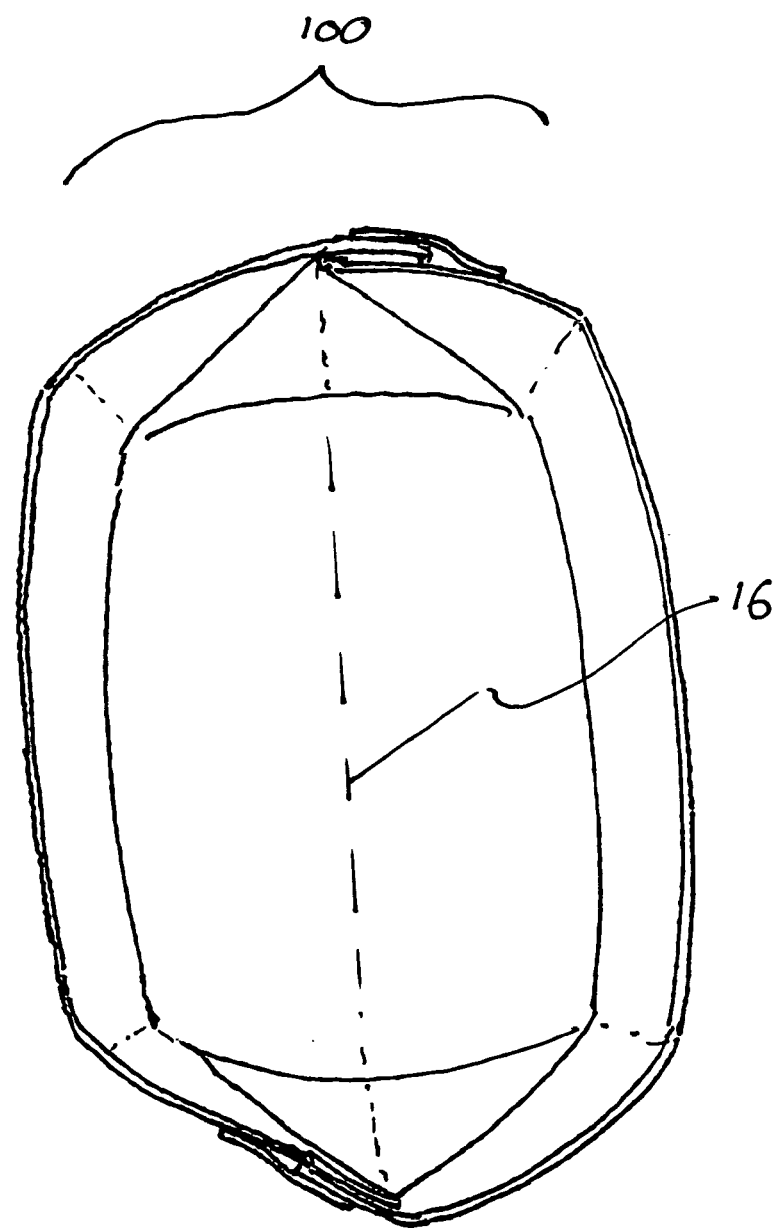
FIG. 5 is a top view of an exemplary embodiment of the present general inventive concept in its open deployed condition.

FIG. 5 is a top view of the sheet 100 in the bowl configuration according to an exemplary embodiment of the present general inventive concept.

Figure 6:
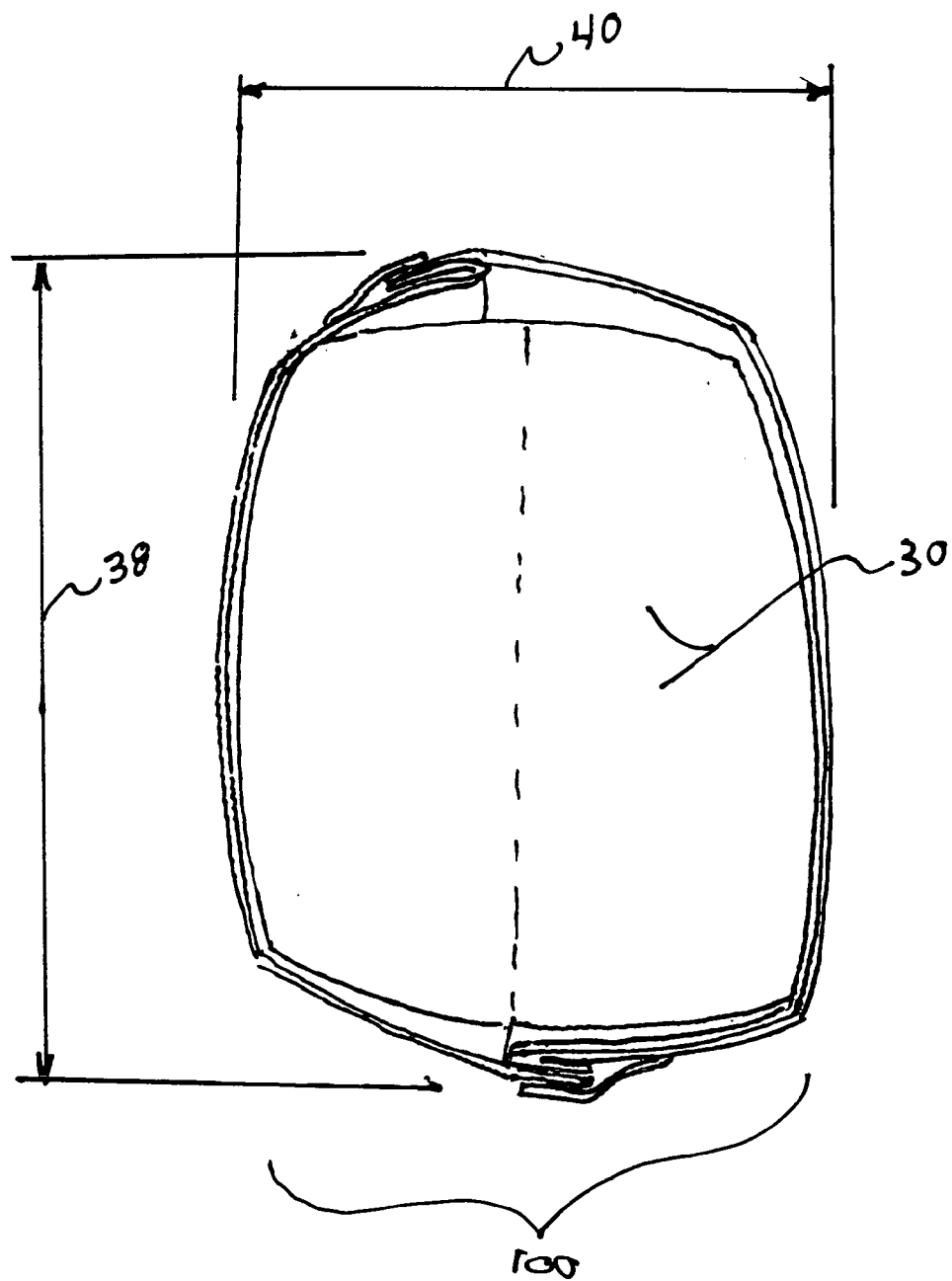
FIG. 6 is a bottom view of an exemplary embodiment of the present general inventive concept in its open deployed condition.
Figure 7:
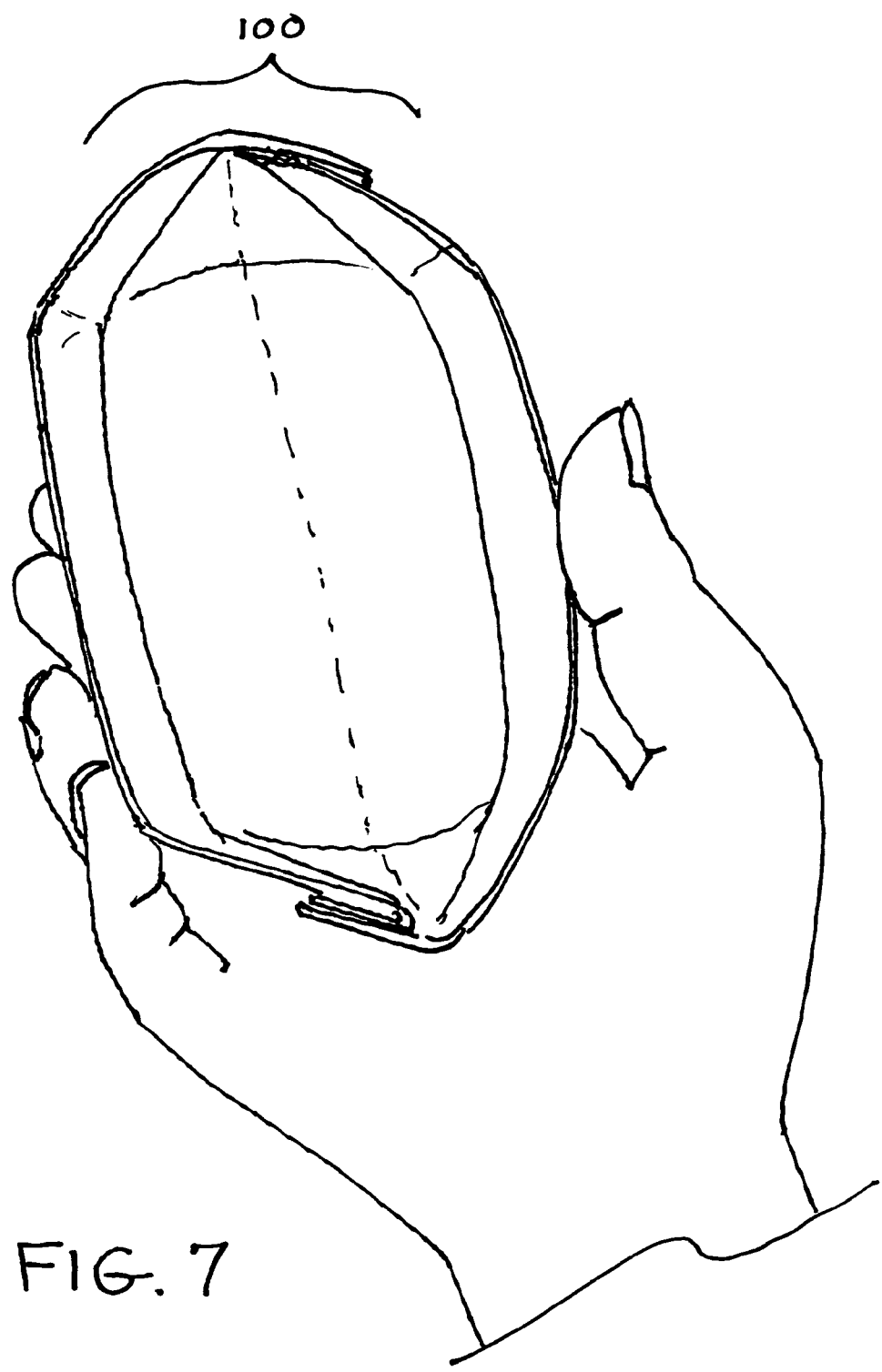
FIG. 7 is a perspective view of an exemplary embodiment of the present general inventive concept in its deployed condition and held in a person's hand.

FIG. 6 is a bottom view of the sheet 100 in the bowl configuration according to an exemplary embodiment of the present general inventive concept. In this exemplary embodiment, the long side walls are approximately five inches long and the short side walls are approximately three and three quarters of an inch long. This size is ideal for fitting in the average person's palm as shown in FIG. 7.

Figure 8:
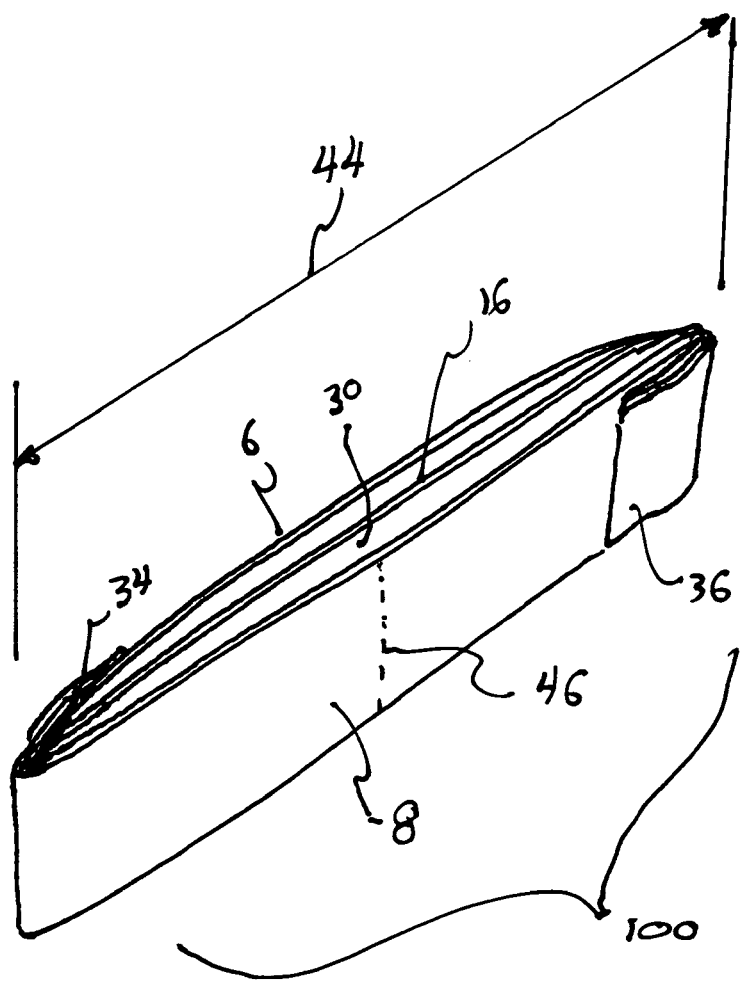
FIG. 8 is a perspective view of an exemplary embodiment of the present general inventive concept in its closed storage and transport condition.

FIG. 8 shows an exemplary embodiment of the sheet 100 in the folded position for storage and transport. In this exemplary embodiment, the folded length 44 is approximately seven inches long, and the sheet 100 can be folded on itself at dotted line 46 to make a total length of three and one half of an inch long which is suitable for storing in a pocket, purse or even a wallet. In this exemplary embodiment, the height 42 of the side walls is approximately one and three quarters of an inch.

The bowl shape resulting from folding the sheet 100 according to exemplary embodiments of the present general inventive concept may be any shape configured to hold material, such as, e.g., dry material such as cereal, or liquid material such as water. The bowl shape may have substantially straight walls 6, 6A-B, 8, and 8A-B, forming a nearly 90-degree angle with the base 30. Alternatively, any of the walls 6, 6A-B, 8, and 8A-B may be formed at a more gradual angle to the base 30, or may be formed to curve, such that the resulting bowl form has a concave inner surface, and a convex outer surface.

Figure 10:
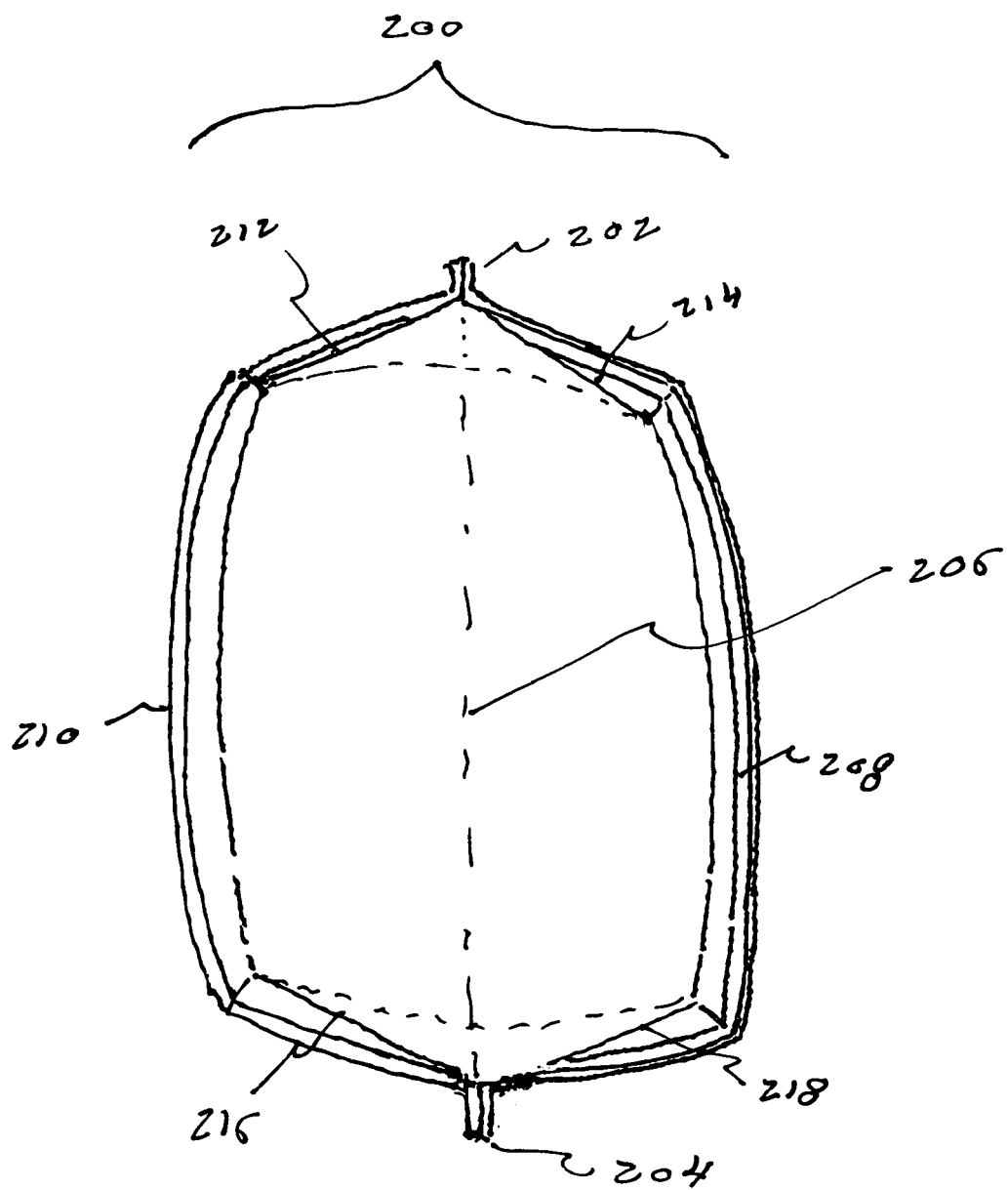
FIG. 10 is a top plan view of an exemplary embodiment of the present general inventive concept showing an alternate design using a different method of end attachment.

FIG. 10 shows a top plan view of a sheet 200 according to another exemplary embodiment of the present general with a simple attachment method at each end 202, 204 of the resulting bowl where the ends are glued together as shown.

Figure 11:
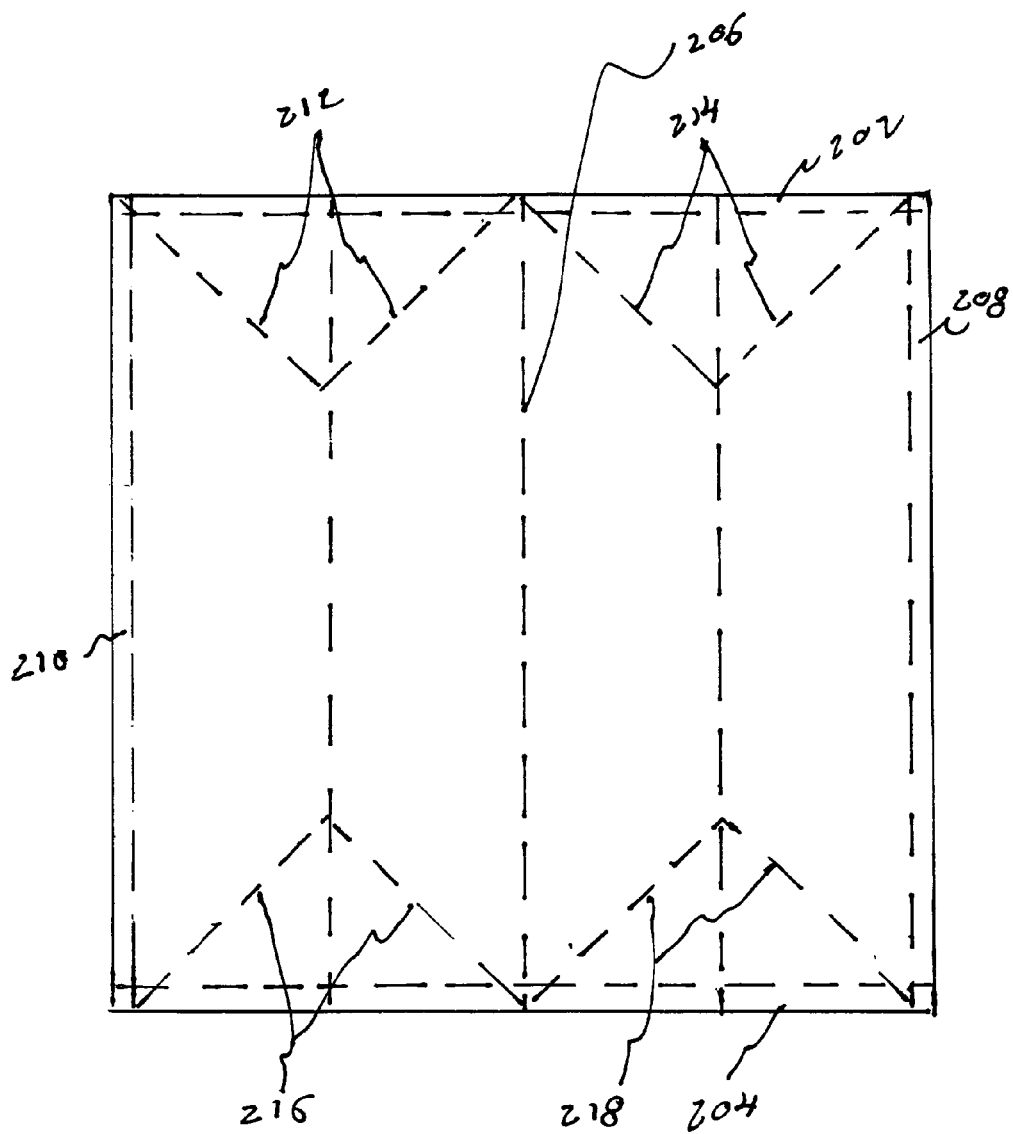
FIG. 11 is a plan view of an exemplary embodiment of the present general inventive concept showing the folding pattern for constructing the alternate design.

FIG. 11 shows a plan view of the sheet 200 in the flat, unfolded position. The side edges 208, 210 are folded over for added strength. Triangular panels formed by dotted lines 212 are folded towards each other and glued or heat sealed. Similarly, triangle sets 214, 216 and 218 are each glued or heat sealed. Central dotted line 206 is a central fold that allows the entire assembly to fold compactly into the general shape shown in FIG. 8, however with welded ends 202, 204 shown in FIG. 10. This exemplary embodiment of the sheet 200 is a simpler construction than the first exemplary embodiment of sheet 100 and is more economical to manufacture. However, this exemplary embodiment of sheet 200 is not as strong as the double walled design in the first exemplary embodiment of sheet 100.

The above described and illustrated exemplary embodiments of the present general inventive concept are an ideal convenient, reusable, disposable solution for providing a bowl or cup. While the primary purpose of the present general inventive concept is to provide a drinking bowl for pets such as dogs or cats, it can also be used by children and adults as a drinking cup or bowl for cereal or other foods. The bowl according to exemplary embodiments of the present general inventive concept is inexpensive, light weight, compact, reusable, disposable and compostable, making it ideal for use in many situations that require a liquid holding receptacle while away from home.

While the present general inventive concept has been described in connection with several preferred embodiments, it is not intended to limit the scope of the invention to the particular forms set forth, but on the contrary, it is intended to cover such alternatives, modifications, and equivalents as may be included within the spirit and scope of the invention as defined by the appended claims.

What is claimed is:

1. A foldable liquid retaining bowl comprising:
    a sheet of bamboo pulp having an unbroken rectangular shape, the sheet being folded into a bowl form without needing to be cut or otherwise modified, the bowl form comprising:
        a base with opposite sides bent up to form opposite ends of the bowl form; and
        two side walls curved to be joined together at the opposite ends; and
    a pair of retaining devices affixed to the opposite ends of the bowl form to maintain the bowl form,
    wherein:
    the sheet is treated on at least one side with a water resistant coating; and
    said folded bowl form is capable of being folded flat for storage and/or transport.

2. The bowl of claim 1, wherein said sheet comprises a coating of forty gram weight PLA which is recyclable and compostable.

3. The bowl of claim 1, wherein at least one of the retaining devices is a glued joint.

4. The bowl of claim 1, wherein at least one of the retaining devices is a heat sealed joint.

5. The bowl of claim 1, further comprising decorative graphics that are printed onto the sheet.

6. The bowl of claim 1, wherein the folded bowl shape is approximately three and one half inches wide, four and one half inches long and one and three quarters of an inch tall.

7. The bowl of claim 1, wherein the two side walls include a folded over edge for added strength along the top perimeter of said bowl.

8. The bowl of claim 1, wherein the bowl is coated with compostable PLA.

9. The bowl of claim 1, wherein the bowl shape includes a concave inner surface.

10. The bowl of claim 1, wherein the sheet is folded into parallel pleats joined at opposite ends by the retaining devices to form the bowl form.

11. The bowl of claim 10, wherein the pleats are each approximately the same size.

12. The bowl of claim 10, further comprising fold lines to fold two of the pleats at an angle, to form two triangular portions at opposite ends of the base which are folded up to form the opposite ends of the bowl form.

13. The bowl of claim 10, further comprising:
    fold lines across a plurality of the pleats, to define triangular portions of the pleats,
    wherein the triangular portions of the pleats are folded towards each other and affixed to one another to create the bowl form.

14. A foldable liquid retaining bowl comprising:
    a sheet of bamboo pulp including a leading edge with a stepped length and a trailing edge opposite the leading edge, the trailing edge having a stepped length, the sheet being folded into a bowl form without needing to be cut or otherwise modified, the bowl form comprising:
        a pair of opposite ends formed by the leading edge and the trailing edge of the sheet;
        a base with opposite sides bent up to form the opposite ends of the bowl form; and
        two side walls curved to be joined together at the opposite ends; and
    a pair of retaining devices affixed to the opposite ends of the bowl form to maintain the bowl form,
    wherein:
    the sheet is treated on at least one side with a water resistant coating; and
    said folded bowl form is capable of being folded flat for storage and/or transport.

* * * * *